(12) United States Patent
Brusatore

(10) Patent No.: US 9,854,750 B2
(45) Date of Patent: Jan. 2, 2018

(54) METHOD AND APPARATUS FOR AUTOMATED HORTICULTURE AND AGRICULTURE

(71) Applicant: VERTICAL DESIGNS LTD., Vancouver (CA)

(72) Inventor: Nicholas G. Brusatore, Port Coquitlam (CA)

(73) Assignee: Affinor Growers Inc., Montreal (CA)

( * ) Notice: Subject to any disclaimer, the term of this patent is extended or adjusted under 35 U.S.C. 154(b) by 232 days.

(21) Appl. No.: 14/373,167

(22) PCT Filed: Jan. 30, 2013

(86) PCT No.: PCT/CA2013/000084
§ 371 (c)(1),
(2) Date: Jul. 18, 2014

(87) PCT Pub. No.: WO2013/113096
PCT Pub. Date: Aug. 8, 2013

(65) Prior Publication Data
US 2014/0366443 A1 Dec. 18, 2014

Related U.S. Application Data

(60) Provisional application No. 61/592,338, filed on Jan. 30, 2012.

(51) Int. Cl.
*A01G 9/02* (2006.01)
*A01G 31/06* (2006.01)
(Continued)

(52) U.S. Cl.
CPC ............... *A01G 9/02* (2013.01); *A01G 1/001* (2013.01); *A01G 9/1423* (2013.01); *A01G 31/06* (2013.01); *Y02P 60/216* (2015.11)

(58) Field of Classification Search
CPC .................................. A01G 1/001; A01G 9/02
(Continued)

(56) References Cited

U.S. PATENT DOCUMENTS 1,500,917 A 7/1924 Bell
1,793,626 A 2/1931 McCormick
(Continued)

FOREIGN PATENT DOCUMENTS

AU 4730079 12/1979
CA 2343254 7/2001
(Continued)

OTHER PUBLICATIONS

European Supplementary Partial European Search Report dated Sep. 8, 2015 issued in connection with the corresponding European Patent Application No. 13744374.
(Continued)

*Primary Examiner* — David Parsley
*Assistant Examiner* — Danielle Clerkley
(74) *Attorney, Agent, or Firm* — Bruce M. Green; Oyen Wiggs Green & Mutala, LLP

(57) ABSTRACT

A method and system for continuous automated growing of plants utilizes production lines each comprising a number of growth sections, each growth section comprising multiple horizontal transport levels, each level of each section having a source of light and liquid nutrient, and plant growing trays which move horizontally into, along and out of each transport level; whereby each subsequent growth section has a greater length than the previous section to receive a greater number of growing trays than the previous section so that as plants grow, the number of plants per growing tray is decreased but the number of plants per growth section remains constant. A group of plants is thereby broken out into an ever greater number of trays as it proceeds through (Continued)

the growing sections from germination to harvest, with the ability to simultaneously start the growth cycle for additional crops.

19 Claims, 17 Drawing Sheets

(51) Int. Cl.
  *A01G 9/14* (2006.01)
  *A01G 1/00* (2006.01)
(58) Field of Classification Search
  USPC .................................. 47/66.6, 66.7, 73, 65
  See application file for complete search history.

(56) References Cited

U.S. PATENT DOCUMENTS

| | | | |
|---|---|---|---|
| 1,914,967 A | 6/1933 | Bebb | |
| 2,244,677 A | 6/1941 | Cornell | |
| 3,254,447 A | 6/1966 | Ruthner | |
| 3,339,308 A | 9/1967 | Clare | |
| 3,529,379 A | 9/1970 | Ware | |
| 3,579,907 A * | 5/1971 | Graves | A01G 31/02 47/17 |
| 3,667,157 A | 6/1972 | Longhini | |
| 3,717,953 A * | 2/1973 | Kuhn | A01G 1/042 47/1.1 |
| 3,747,268 A | 7/1973 | Linder | |
| 3,772,827 A * | 11/1973 | Ware | A01G 9/022 47/39 |
| 3,824,736 A * | 7/1974 | Davis | A01G 7/045 47/17 |
| 3,882,634 A | 5/1975 | Dedolph | |
| 3,909,978 A | 10/1975 | Fleming | |
| 3,973,353 A | 8/1976 | Dedolph | |
| 3,991,514 A | 11/1976 | Finck | |
| 4,028,847 A | 6/1977 | Davis et al. | |
| 4,085,544 A | 4/1978 | Blake | |
| 4,255,897 A | 3/1981 | Ruthner | |
| 4,337,986 A | 7/1982 | Haub et al. | |
| 4,356,664 A * | 11/1982 | Ruthner | A01G 31/042 47/17 |
| 4,628,631 A | 12/1986 | Van Wingerden | |
| 4,908,315 A | 5/1990 | Kertz | |
| 4,978,505 A | 12/1990 | Kertz | |
| 5,022,183 A | 6/1991 | Bohlmann | |
| 5,042,196 A * | 8/1991 | Lukawski | A01G 31/02 47/62 C |
| 5,157,869 A | 10/1992 | Minton | |
| 5,165,364 A | 11/1992 | Horkey | |
| 5,088,231 A | 12/1992 | Kertz | |
| 5,171,683 A | 12/1992 | Kertz | |
| 5,372,474 A | 12/1994 | Miller | |
| 5,464,456 A | 11/1995 | Kertz | |
| 5,491,929 A | 2/1996 | Peacock et al. | |
| 5,511,340 A | 4/1996 | Kertz | |
| 5,515,648 A | 5/1996 | Sparkes | |
| 5,584,141 A | 12/1996 | Johnson | |
| 5,617,673 A | 4/1997 | Takashima | |
| 5,664,369 A | 9/1997 | Kertz | |
| 5,856,190 A * | 1/1999 | Iwai | A01G 31/06 435/420 |
| 5,862,628 A | 1/1999 | Takashima | |
| 6,122,861 A | 9/2000 | Kertz | |
| 6,125,991 A | 10/2000 | Veldkamp et al. | |
| 6,173,529 B1 | 1/2001 | Kertz | |
| 6,378,246 B1 | 4/2002 | DeFoor | |
| 6,394,030 B1 | 5/2002 | Geiger et al. | |
| 6,557,491 B1 | 5/2003 | Weiser et al. | |
| 6,604,321 B2 | 8/2003 | Marchildon | |
| 6,766,817 B2 | 7/2004 | da Silva | |
| 6,837,002 B2 | 1/2005 | Costa | |
| 6,840,007 B2 | 1/2005 | Leduc et al. | |
| 6,918,404 B2 | 7/2005 | da Silva | |
| 6,928,772 B2 | 8/2005 | Bai et al. | |
| 6,951,076 B2 | 10/2005 | Winsbury | |
| 6,983,562 B2 | 1/2006 | Sanderson | |
| 7,049,743 B2 | 5/2006 | Uchiyama | |
| 7,066,586 B2 | 6/2006 | da Silva | |
| 7,143,544 B2 | 12/2006 | Roy | |
| 7,168,206 B2 | 1/2007 | Agius | |
| 7,181,886 B2 | 2/2007 | Bourgoin et al. | |
| 7,188,451 B2 | 3/2007 | Marchildon | |
| 7,285,255 B2 | 10/2007 | Kadlec et al. | |
| 7,401,437 B2 | 7/2008 | Dumont | |
| 7,415,796 B2 | 8/2008 | Brusatore | |
| 7,488,098 B2 | 2/2009 | Dumont | |
| 7,533,493 B2 | 5/2009 | Brusatore | |
| D596,527 S | 7/2009 | Kertz | |
| 7,559,173 B2 | 7/2009 | Brusatore | |
| D606,451 S | 12/2009 | Kertz | |
| D624,454 S | 9/2010 | Kertz | |
| 7,818,917 B2 | 10/2010 | Brusatore | |
| 7,984,586 B2 | 7/2011 | Brusatore | |
| 8,234,814 B2 | 8/2012 | Kertz | |
| 8,453,380 B1 | 6/2013 | Helder et al. | |
| 2002/0023823 A1 | 2/2002 | Hoffman et al. | |
| 2002/0144461 A1 | 10/2002 | Marchildon | |
| 2004/0111965 A1 | 6/2004 | Agius | |
| 2004/0163308 A1 | 8/2004 | Uchiyama | |
| 2004/0237386 A1 | 12/2004 | Madsen et al. | |
| 2005/0011119 A1 | 1/2005 | Bourgoin et al. | |
| 2005/0039396 A1 | 2/2005 | Marchildon | |
| 2005/0039397 A1 | 2/2005 | Roy | |
| 2005/0055878 A1 | 3/2005 | Dumont | |
| 2005/0155287 A1 | 7/2005 | Phillips | |
| 2005/0257424 A1 | 11/2005 | Bissonnette et al. | |
| 2005/0268547 A1 | 12/2005 | Uchiyama | |
| 2006/0150481 A1 | 7/2006 | Hung et al. | |
| 2006/0162252 A1 | 7/2006 | Lim | |
| 2006/0196118 A1 | 9/2006 | Brusatore | |
| 2006/0230674 A1 | 10/2006 | Marchildon | |
| 2006/0272210 A1 | 12/2006 | Bissonnette et al. | |
| 2007/0094926 A1 | 5/2007 | Branson et al. | |
| 2007/0141912 A1 | 6/2007 | Dumont | |
| 2007/0212281 A1 | 9/2007 | Kadlec et al. | |
| 2007/0251145 A1 | 11/2007 | Brusatore | |
| 2007/0271842 A1 | 11/2007 | Bissonnette et al. | |
| 2007/0289206 A1 | 12/2007 | Kertz | |
| 2008/0015531 A1 | 1/2008 | Hird et al. | |
| 2008/0110088 A1 | 5/2008 | Brusatore | |
| 2008/0222949 A1 | 9/2008 | Bissonnette et al. | |
| 2008/0274494 A1 | 11/2008 | Kertz | |
| 2010/0024292 A1 | 2/2010 | Kertz | |
| 2010/0024294 A1 | 2/2010 | Kertz | |
| 2010/0115837 A1* | 5/2010 | Van Der Poel | A01G 7/045 47/66.6 |
| 2010/0236147 A1 | 9/2010 | Brusatore | |
| 2011/0192082 A1* | 8/2011 | Uchiyama | A01G 9/24 47/66.6 |
| 2012/0054061 A1* | 3/2012 | Fok | A01G 31/00 705/26.5 |
| 2012/0060416 A1* | 3/2012 | Brusatore | A01G 31/06 47/62 A |
| 2012/0137578 A1 | 6/2012 | Bradford et al. | |
| 2014/0196363 A1 | 7/2014 | Chung | |

FOREIGN PATENT DOCUMENTS

| | | |
|---|---|---|
| CA | 2396317 | 11/2002 |
| CA | 2412073 | 5/2004 |
| CA | 2503705 | 6/2004 |
| CA | 2431523 | 12/2004 |
| CA | 2536116 | 2/2005 |
| DE | 3404300 A1 | 8/1985 |
| EP | 1183942 | 3/2002 |
| EP | 1559311 | 8/2005 |
| EP | 1733614 | 12/2006 |
| EP | 2005816 | 12/2008 |
| FR | 1475610 | 4/1967 |
| FR | 2240684 | 3/1975 |

(56) References Cited

FOREIGN PATENT DOCUMENTS

| | | |
|---|---|---|
| FR | 2345912 | 10/1977 |
| FR | 2680074 | 2/1993 |
| GB | 1512606 A | 6/1978 |
| GB | 2026831 | 2/1980 |
| GB | 2269304 | 2/1994 |
| JP | 49112735 | 9/1974 |
| JP | 60-012409 | 1/1985 |
| JP | 61122677 | 8/1986 |
| JP | 4229111 | 8/1992 |
| JP | 10-215701 | 8/1998 |
| JP | 2001128571 | 5/2001 |
| JP | 2006507848 | 3/2006 |
| RU | 2034448 | 5/1992 |
| SU | 420288 | 3/1974 |
| SU | 650557 | 3/1979 |
| SU | 914004 | 3/1982 |
| SU | 1722301 | 3/1992 |
| WO | 2003022036 | 3/2003 |
| WO | 2006096650 | 9/2006 |
| WO | 2007147028 | 12/2007 |
| WO | 2008156538 | 12/2008 |
| WO | 2009155032 | 12/2009 |
| WO | 2010014597 | 2/2010 |
| WO | 2010014600 | 2/2010 |
| WO | 2010029993 A1 | 3/2010 |
| WO | 2010110844 | 9/2010 |
| WO | 2011007112 | 1/2011 |
| WO | 2011067548 | 9/2011 |

OTHER PUBLICATIONS

International Search Report issued on PCT/CA2015/050127.
PCT International Search Report dated Apr. 10, 2013 for PCT/CA2013/000084.
PCT International Search Report and the Written Opinion in International Application No. PCT/US2006/007945 dated May 8, 2007.
PCT International Search Report and the Written Opinion in International App. No. PCT/US08/06416 dated Sep. 29, 2008.
PCT International Search Report and the Written Opinion in International App. No. PCT/US10/00704 dated May 18, 2010.
International Preliminary Examination Report for PCT/AU02/00097 dated Apr. 30, 2002.
PCT International Search Report for International App. No. PCT/AU02/00097 dated Mar. 1, 2002.

* cited by examiner

METHOD AND APPARATUS FOR AUTOMATED HORTICULTURE AND AGRICULTURE

CROSS REFERENCE TO RELATED APPLICATION

The present application claims the benefits, under 35 U.S.C. §119(e), of U.S. Provisional Application Ser. No. 61/592,338 filed Jan. 30, 2012 entitled "Method and Apparatus for Automated Horticulture and Agriculture" which is incorporated herein by this reference

TECHNICAL FIELD

The invention relates to the fields of horticulture and agriculture and particularly apparatus and methods for automated commercial growth and production of plants in controlled environments.

BACKGROUND

Traditionally the commercial horticultural and agricultural growth of plants has been carried out in nurseries and greenhouses, where the plants are arranged horizontally and are stationary. More efficient methods have more recently been developed, some of which are referred to as 'vertical farming'. The present inventor, for example, in U.S. Pat. Nos. 7,415,796, 7,533,494, 7,559,173, 7,818,917 and 7,984,586 disclosed methods of growing plants using a rotating vertical carousel of rotating spheres, each having a central light source around which rows of plants are rotated, to thereby increase the productivity of plant growth in a given area. However harvesting of mature plants from such systems can be complicated and time consuming.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention provides a method and system for continuous automated growing of plants. The method utilizes one or more production lines each comprising a first and subsequent growth sections, each growth section comprising a plurality of horizontal transport levels, each level of each section having a source of light and liquid nutrient, and a plurality of growing trays which are adapted to move horizontally into, along and out of each one of said transport levels; whereby each subsequent growth section has a greater length than the previous section to thereby receive a greater number of growing trays than the previous section so that as plants grow in the growing trays, the number of plants per growing tray is decreased but the number of plants per growth section remains generally constant, the method comprising:
i) planting a first group of said growing trays with seeds, the number of seeds planted in each tray being selected according to the type of plant, the size of trays, and the relative number and lengths of said growing sections;
ii) introducing said first group of seeded trays into the first growing section;
iii) after a sufficient germination period, transplanting the first group of plants from the first group of trays into a greater number of trays able to be received in the next subsequent growing section;
iv) introducing the trays containing the first group of plants into the first subsequent growing section;
v) introducing a second group of seeded trays into the first growing section;
vi) after the first group of plants have grown for a sufficient period of time in said first subsequent section, transferring the first group of plants again into a greater number of trays able to be received in the next subsequent growing section;
vii) introducing the trays containing the first group of plants into the next subsequent growing section;
viii) transplanting the second group of plants from the second group of trays into a greater number of trays able to be received in the next subsequent growing section;
ix) introducing the trays containing the second group of plants into the next subsequent growing section;
x) repeating steps i) through ix) mutatis mutandis for the first, second and subsequent groups of plants from the first, second and subsequent groups of seeded trays;
xi) once the plants in a group of trays are in the final subsequent growth section and are ready to harvest, removing the group of trays from the final growth section and harvesting said plants.

According to one aspect of the invention each growing section comprises multi-level growing units, each independently controlled for light cycle and feeding and irrigation cycle and which may be computer operated so that the system can be programmed for different plants having differing growth cycles, without any changes to the configuration of the installation. The invention further provides a system constructed to carry out the foregoing method and a growing tray specially designed for horizontal movement on rollers within the multi-level growing units. The growing tray has an automatic filling and draining cycle which is regulated by a novel form of bell siphon. The bell siphon uses a baffle having passages of variable diameter situated between the stand-up pipe and the bell so that the degree of vacuum can be selected and the timing of the fill and drain cycle selected as necessary.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
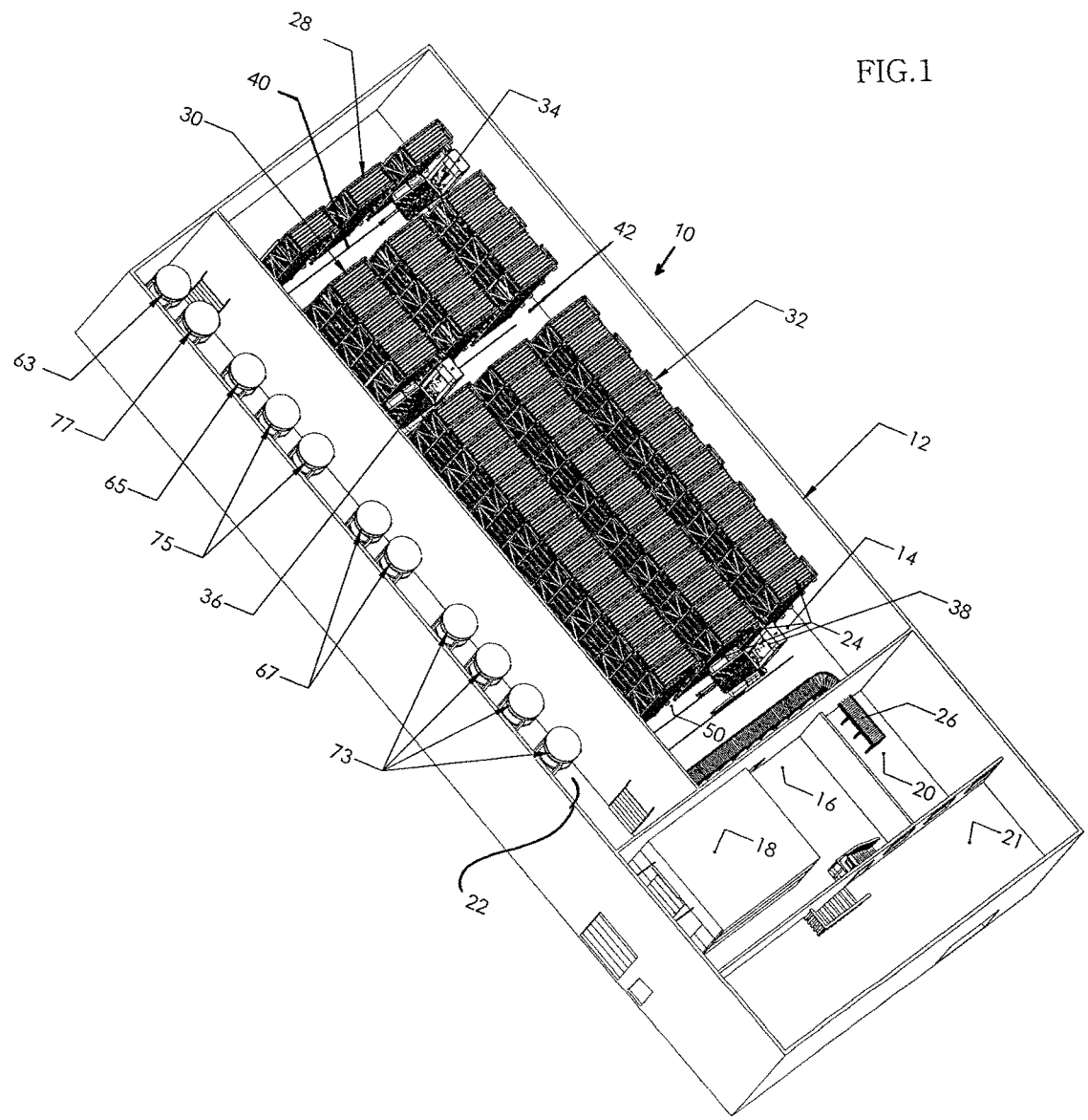
FIG. 1 is a perspective view of an installation for carrying out the method of the invention.
Figure 2:
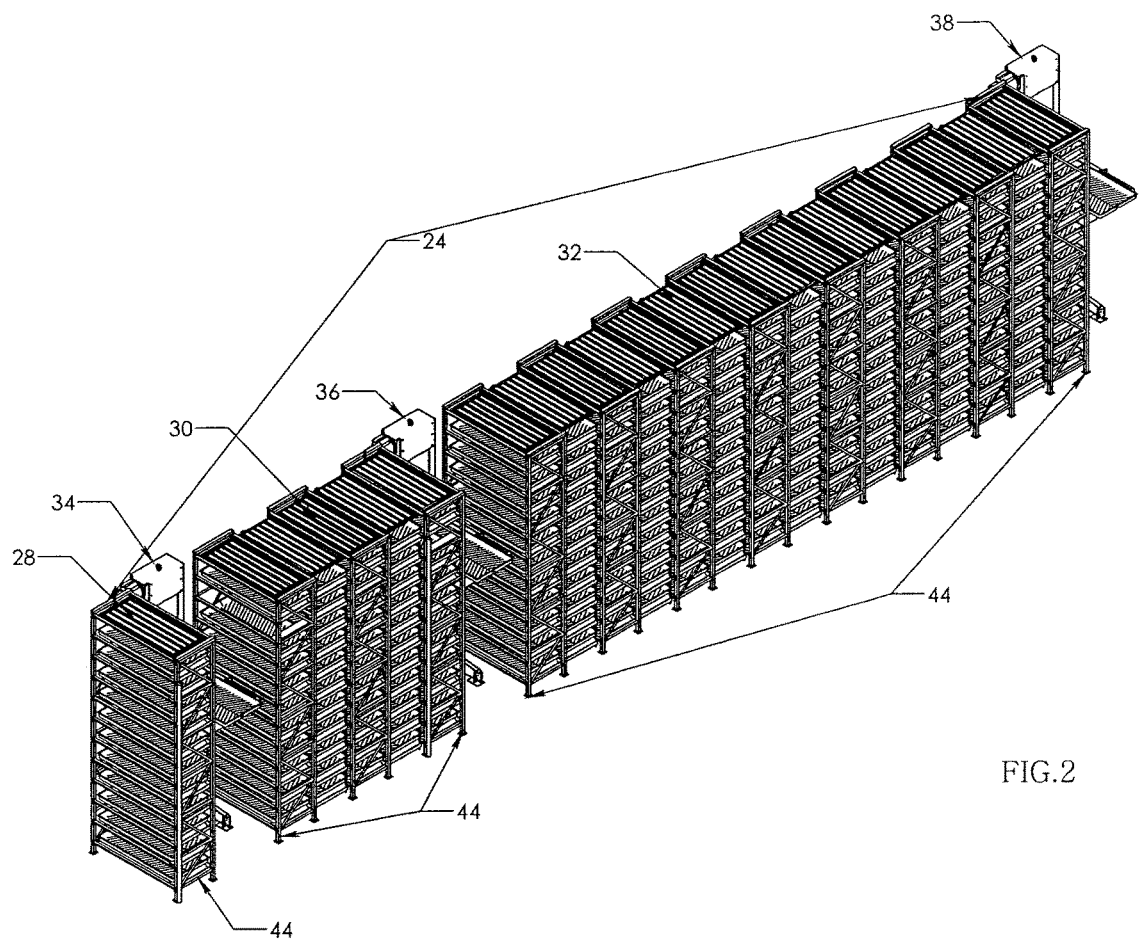
FIG. 2 is a perspective view of a single production line of the installation shown in FIG. 1.
Figure 3:
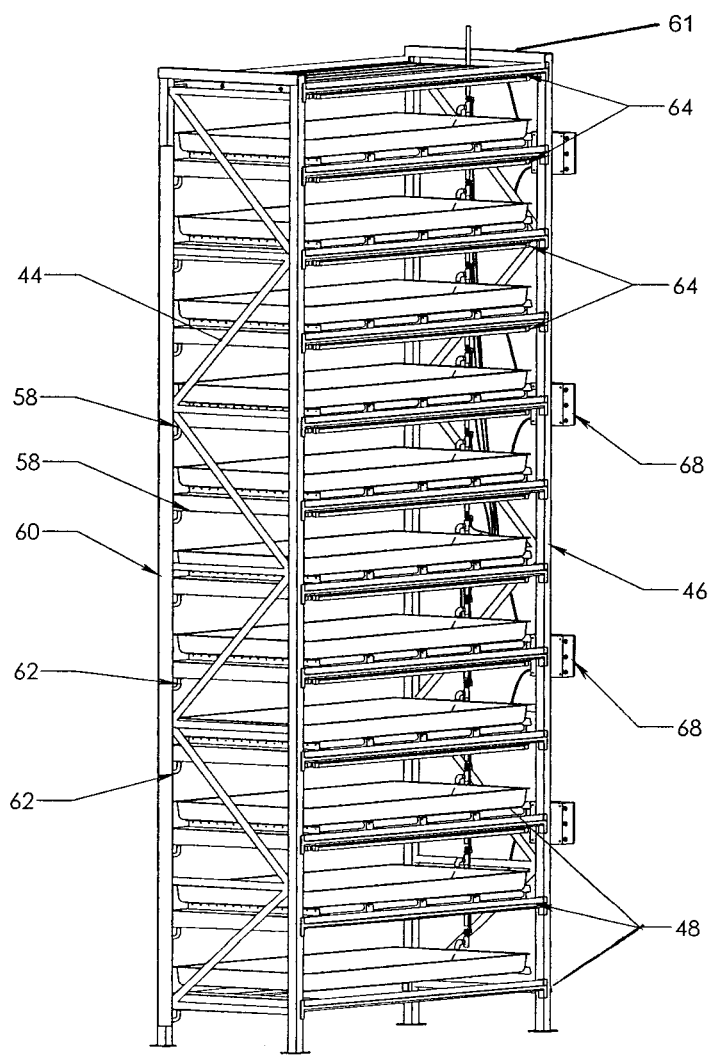
FIG. 3 is a front right perspective view of a single unit of a production line of the installation shown in FIG. 2.
Figure 4:
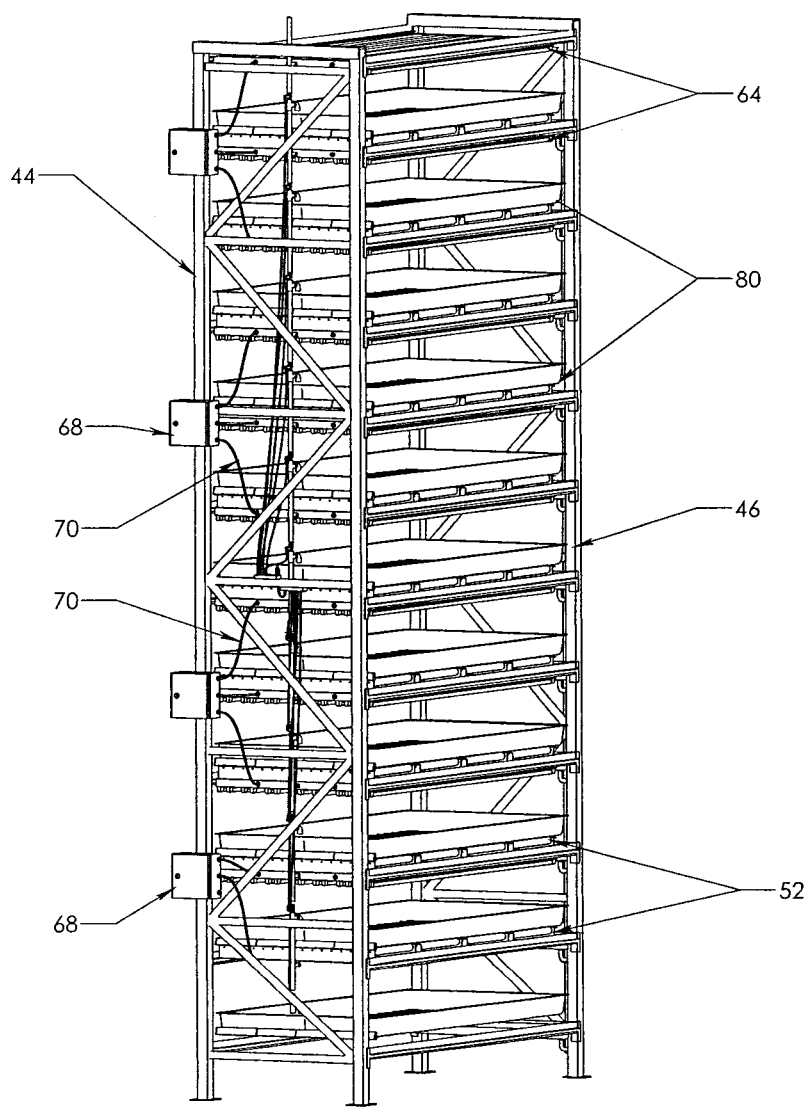
FIG. 4 is a left rear perspective view of a single unit of a production line of the installation shown in FIG. 2.
Figure 5:
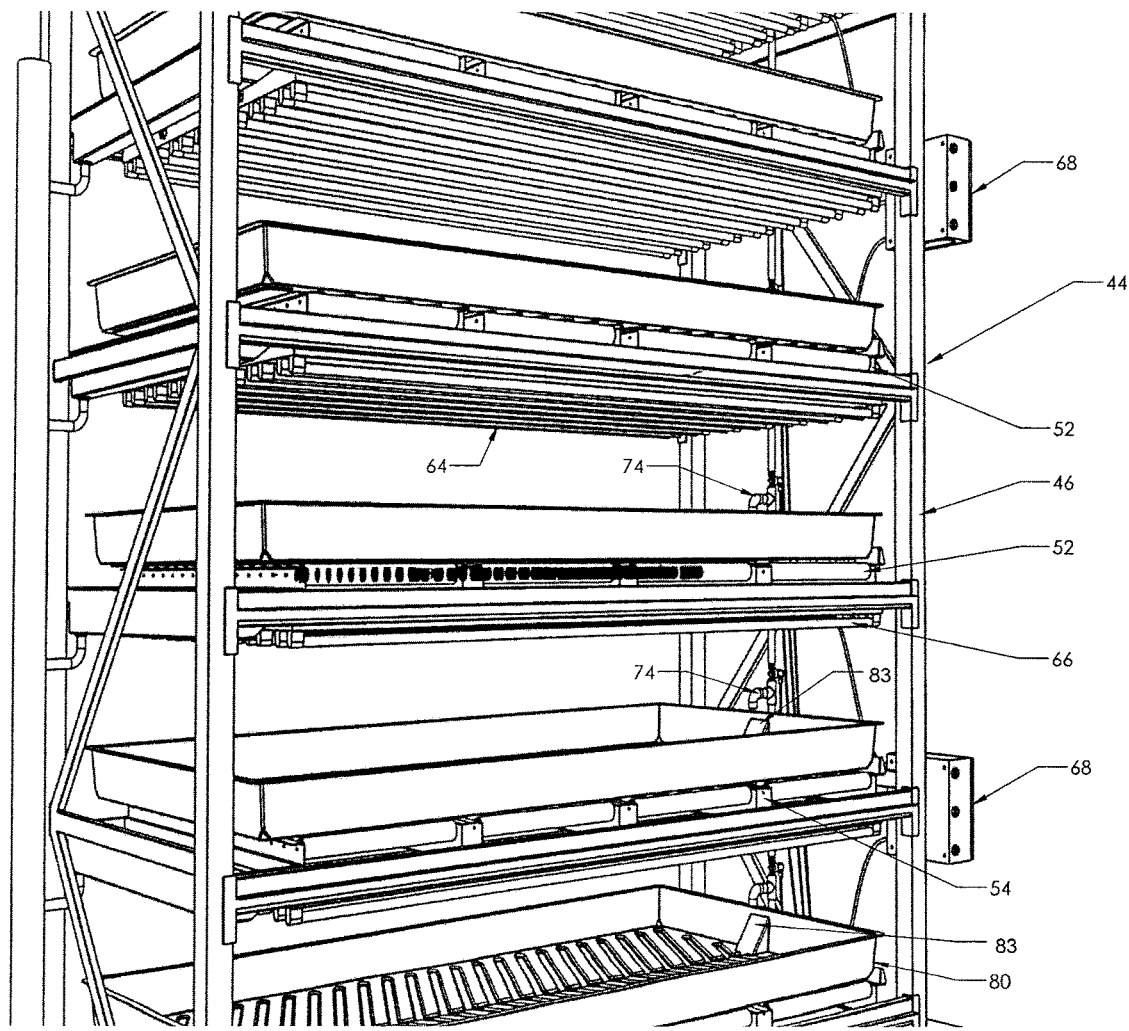
FIG. 5 is a detail of the perspective view shown in FIG. 4.
Figure 6:
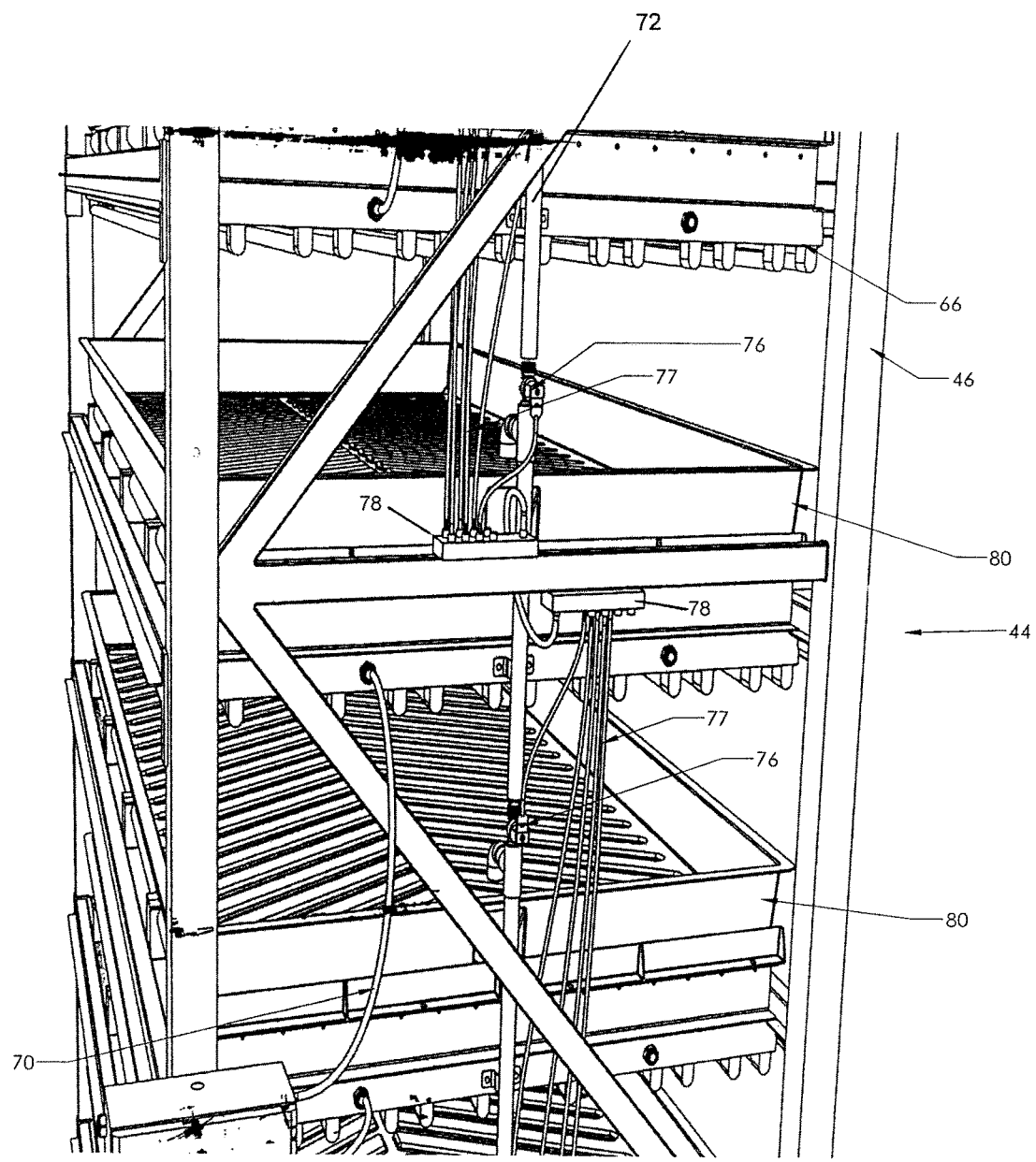
FIG. 6 is a detail of the perspective view shown in FIG. 3.
Figure 7:
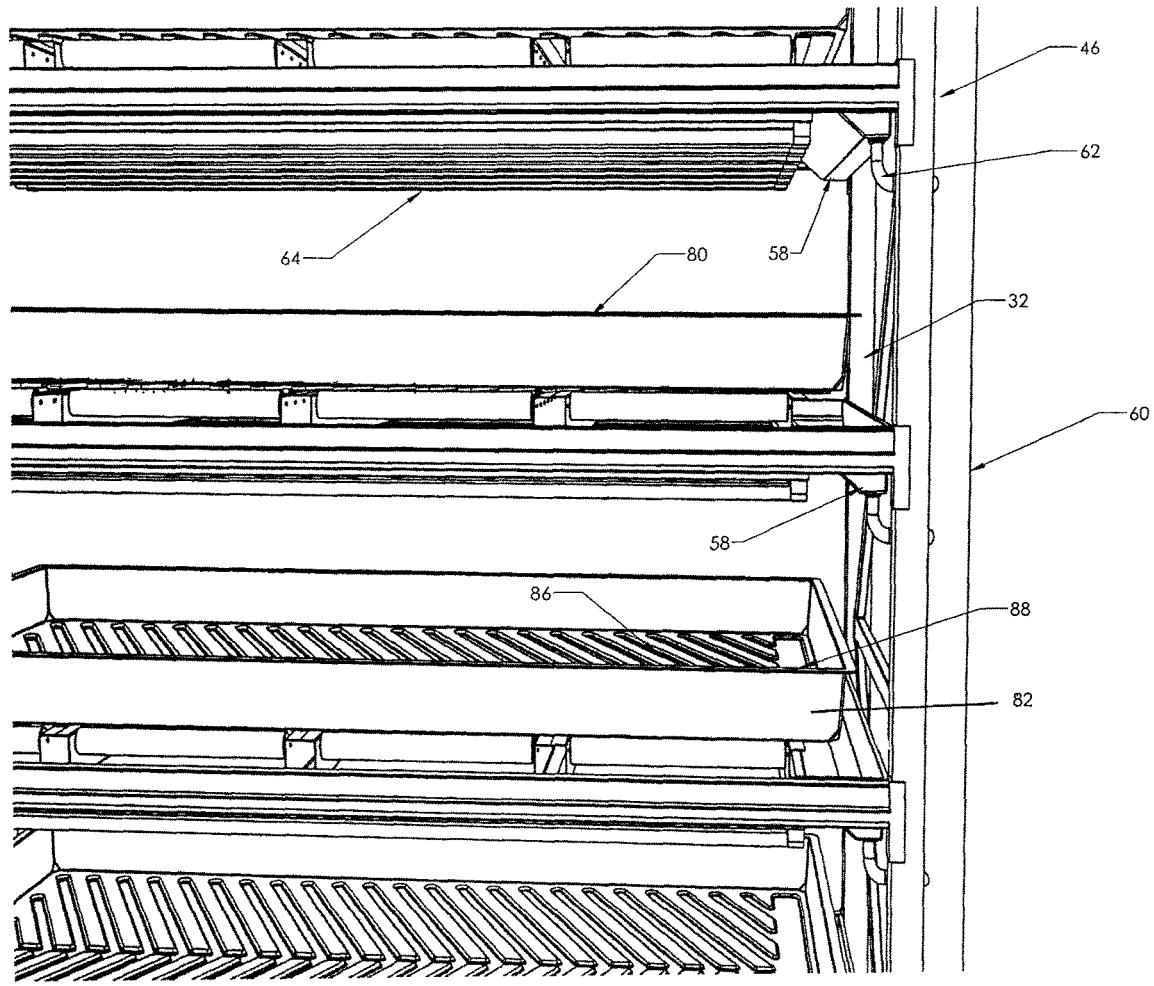
FIG. 7 is a further detail of the perspective view shown in FIG. 4.
Figure 8:
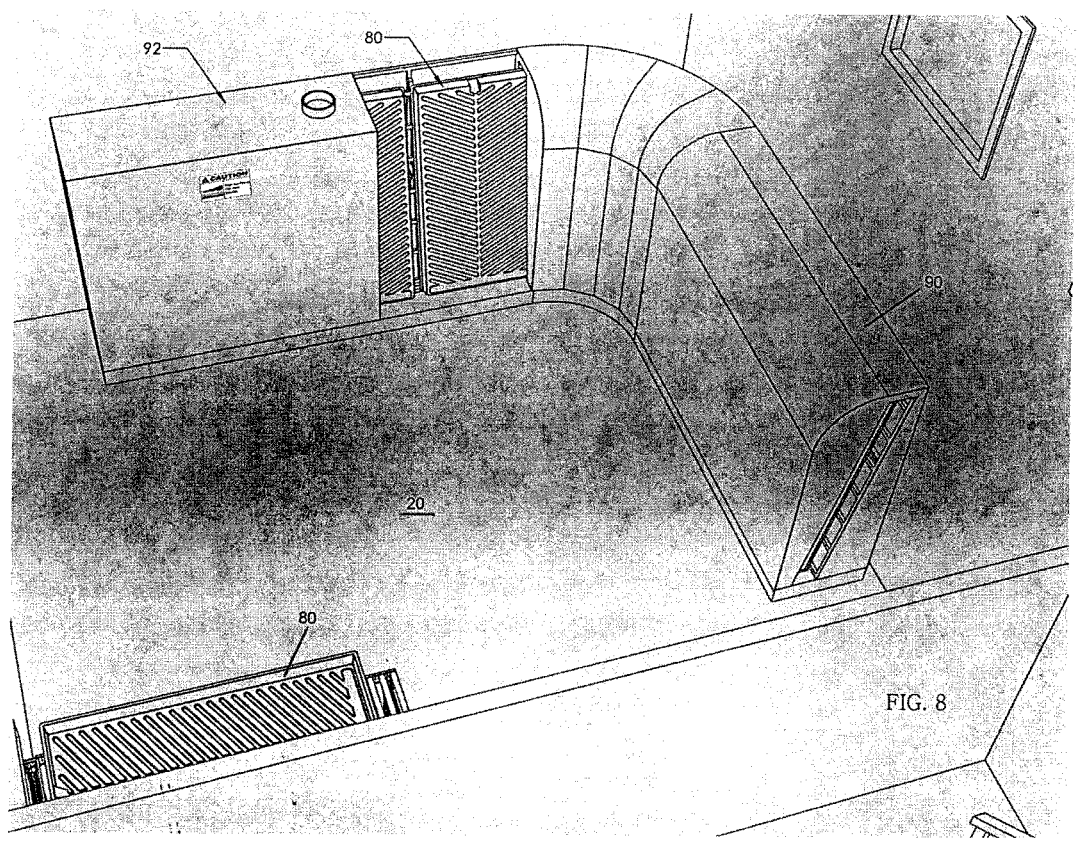
FIG. 8 is a perspective view of a cleaning area of the installation shown in FIG. 1.

With reference to FIG. 1, an installation for automated cultivation and harvesting of plants is designated generally as 10, installed in a large building 12 such as a warehouse. The installation 10 includes the growing and harvesting area 14, cropping and packaging area 16, cold storage 18, cleaning area 20, seeding area 21 and tank storage area 22. The growing area comprises a plurality of production lines 24, one of which is shown in FIG. 2. A conveyor 26 carries trays 80 from the production lines 24 through the cropping and packaging area 16 to the cleaning area 20.

With reference to FIG. 2, each production line 24 comprises a germination section 28, a second stage growth section 30 and a third stage growth section 32. Preferably each production line 24 will have one germination section unit 44, five second stage units 44 and fifteen third stage units 44. Wheeled scissor lifts 34, 36 are provided between germination section 28 and second stage section 30, and between second stage section 30 and third stage section 32 respectively. A third wheeled scissor lift 38 is provided to remove the finished product at the end of each production line 24. Scissor lifts 34, 36 and 38 are motorized and move in the direction perpendicular to production lines along pathways 40, 42, 50 to permit the scissor lifts to service each production line 24.

FIGS. 3-7 illustrate an individual unit 44 of a production line 24. Each unit comprises a frame 46 forming a number of transport levels 48. In the embodiment shown, there are 11 transport levels 48 but a larger or smaller number can be provided depending on the desired size of the operation. Each transport level comprises a plurality of parallel rollers 52 which are bearing mounted for rotation in transversely extending roller supports 54. Rollers 52 support the plant trays 80. Each transport level also has a drainage trough 58 which drains into vertical drainage pipes 60 through connecting tubes 62.

On the underside of each transport level 48, and on the underside of top level 61, are arrays 64 of fluorescent lamps 66, preferably 14 parallel 8 foot T8 High Output fluorescent lamps 66 per array 64. Preferably three arrays 64 on adjacent levels are controlled by a single remotely controlled electrical switch 68 connected by conductors 70. While fluorescent lamps are shown, other growth promoting lights can be used, such as light emitting diodes (LEDs), high pressure sodium lamps, metal halide lamps or incandescent light bulbs. The electrical switches 68 are programmed to provide a coordinated light cycle (photoperiod) for the plants at each growth stage and depending on the particular plant.

Liquid supply pipe 72 supplies liquid nutrient solution to the trays on each level through outlets 74. Each outlet is controlled by solenoid valves 76, which are electrically controlled by wireless controllers 78 to which they are connected by conductors 77. Liquid nutrient is delivered to the liquid supply pipe 72 from feed tanks 73, 75, 77 for each of stages 32, 30, 28 respectively. The liquid nutrient solution is mixed in batch tanks 63, 65, 67 for each of stages 28, 30, 32 respectively.

Plant trays 80 are preferably molded plastic trays 4 feet wide by 8 feet long, with 6-inch high side walls 82. Ramps 83 can be used to avoid splashing as the liquid flows to the bottom of the tray. The pattern of channels 84, 86 in the upper inner surface of the trays 80 causes the nutrient solution to be equally distributed throughout the tray until it flows out the drainage holes 88 at the end of tray 80 opposite from the outlets 74.

To maintain the liquid in the trays at the proper level, prevent overflow and periodically drain trays 80, preferably a bell siphon 89 is used in the drainage hole 88, as illustrated in FIGS. 15-18. Bell siphon 89 comprises a stand-up pipe 100 having threaded ends 102, 104, O-ring 106, cylindrical enclosure 108, bell 110, annular collar 112 having holes 113 and retaining ring. O-ring 106 sits in groove 107. Stand-up pipe 100 is screwed into the drainage hole 88 by threaded end 102, with O-ring 106 thereby being compressed between stand-up pipe 100 and tray 80. Drainage hole 88 is connected to drainage trough 58 which drains into vertical drainage pipes 60 through connecting tubes 62. Stand-up pipe 100 has a lower central cylindrical passage 114 and an upper cylindrical passage 116 with a greater diameter than the lower section and joined by a shoulder 115 having a beveled angle M. Collar 112 threads onto threaded end 104 of stand-up pipe 100 and bears against shoulder 120 which is formed between the lower section 122 of bell 110 and the upper section 124 which has a smaller diameter. Bell siphon 89 operates in the usual way to prevent the tray from filling to a higher level than the height of stand-up pipe 100, and periodically draining and refilling the tray by a siphon action.

Bell 110 is sized so that liquid from tray 80 is able to flow under the lower edge of bell 110 into the space between bell 110 and the stand-up pipe 100. As the tray fills, liquid flows through holes 113 and into the stand-up pipe 100 to flow through drainage hole 88. Thus collar 112 acts as a baffle to restrict the flow of liquid and by varying the number of holes 113 in collar 112 the length of time to fill the tray, and the length of time the tray will drain before the siphon is broken, can be varied. For example a collar with 6 holes of the same diameter as the 8-hole version shown can be substituted to cause the tray to fill and drain on a quicker schedule.

Figure 9:
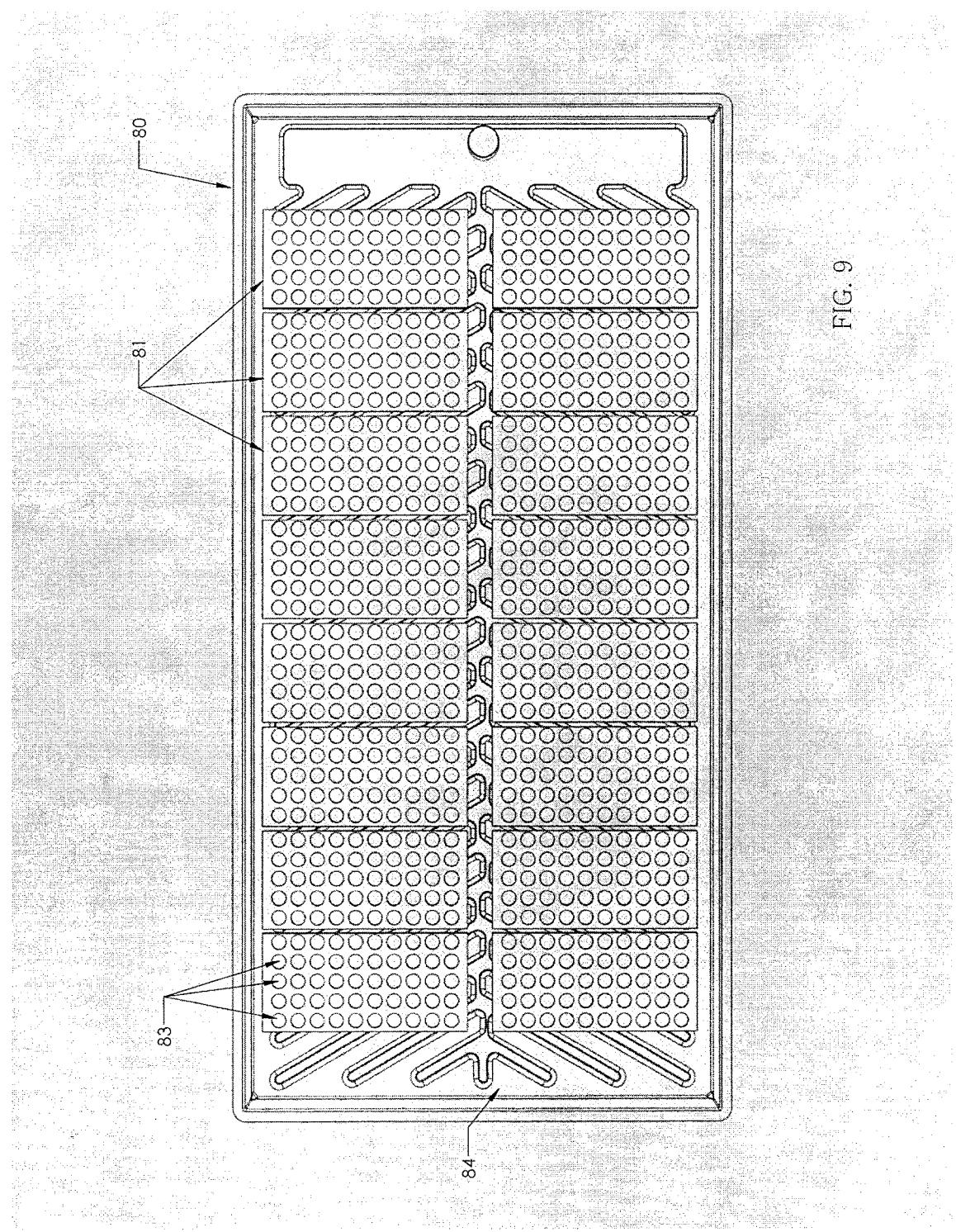
FIG. 9 is a top view of a germination tray with 16 seed flats.
Figure 10:
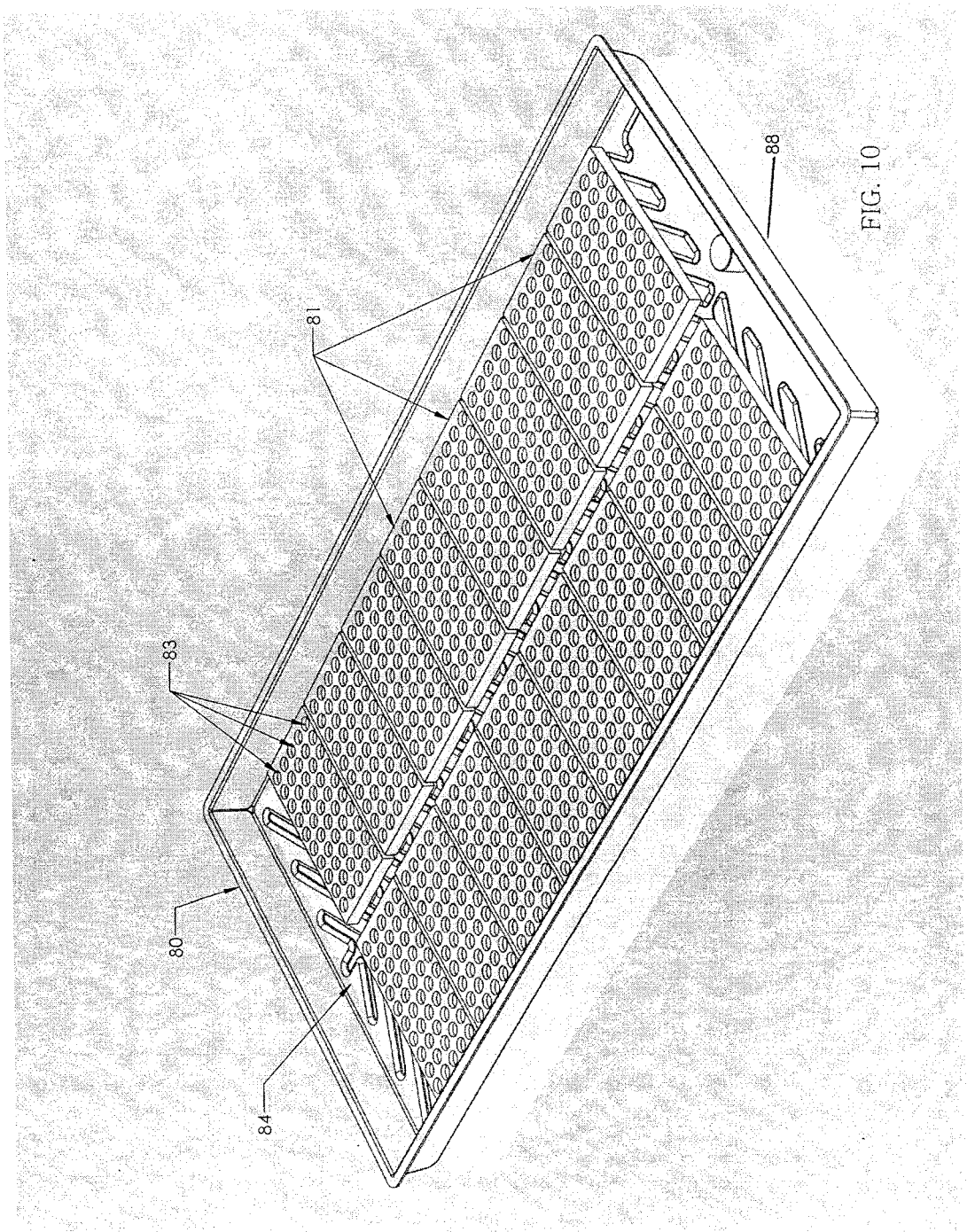
FIG. 10 is a perspective view of the germination tray shown in FIG. 9.
Figure 11:
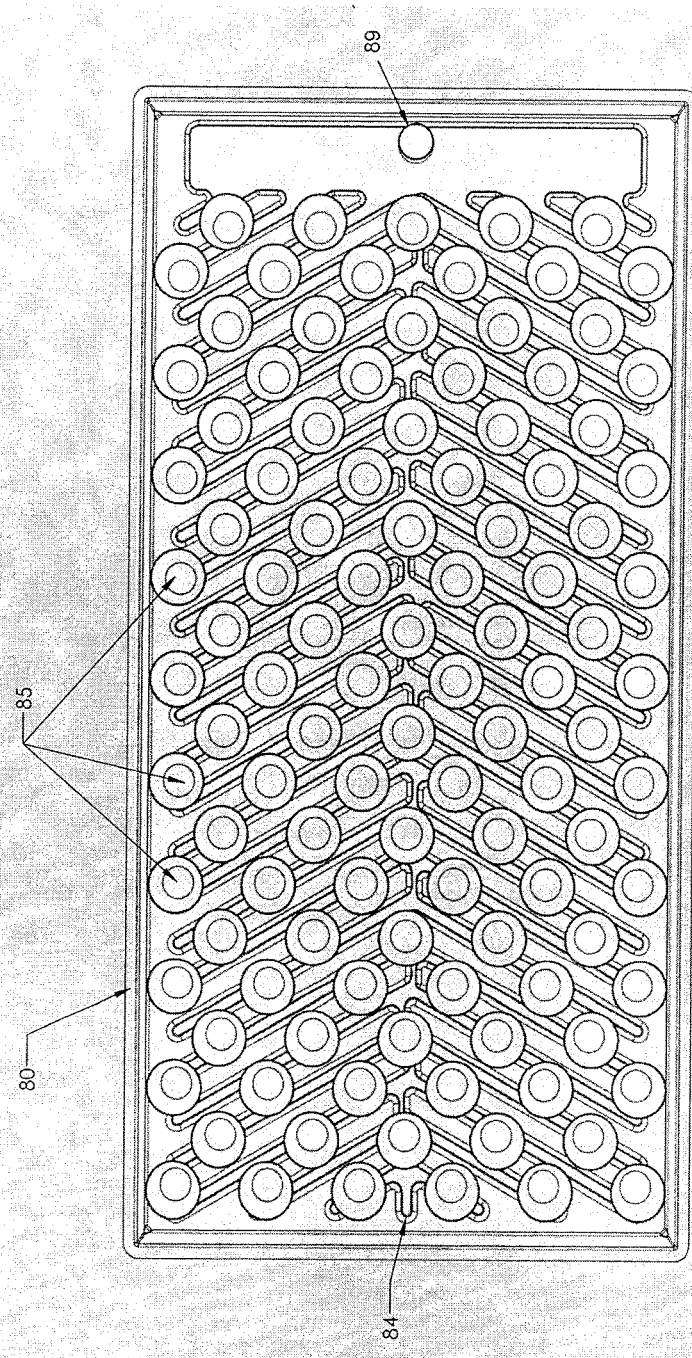
FIG. 11 is a top view of a tray for the second stage with 165 pots.
Figure 12:
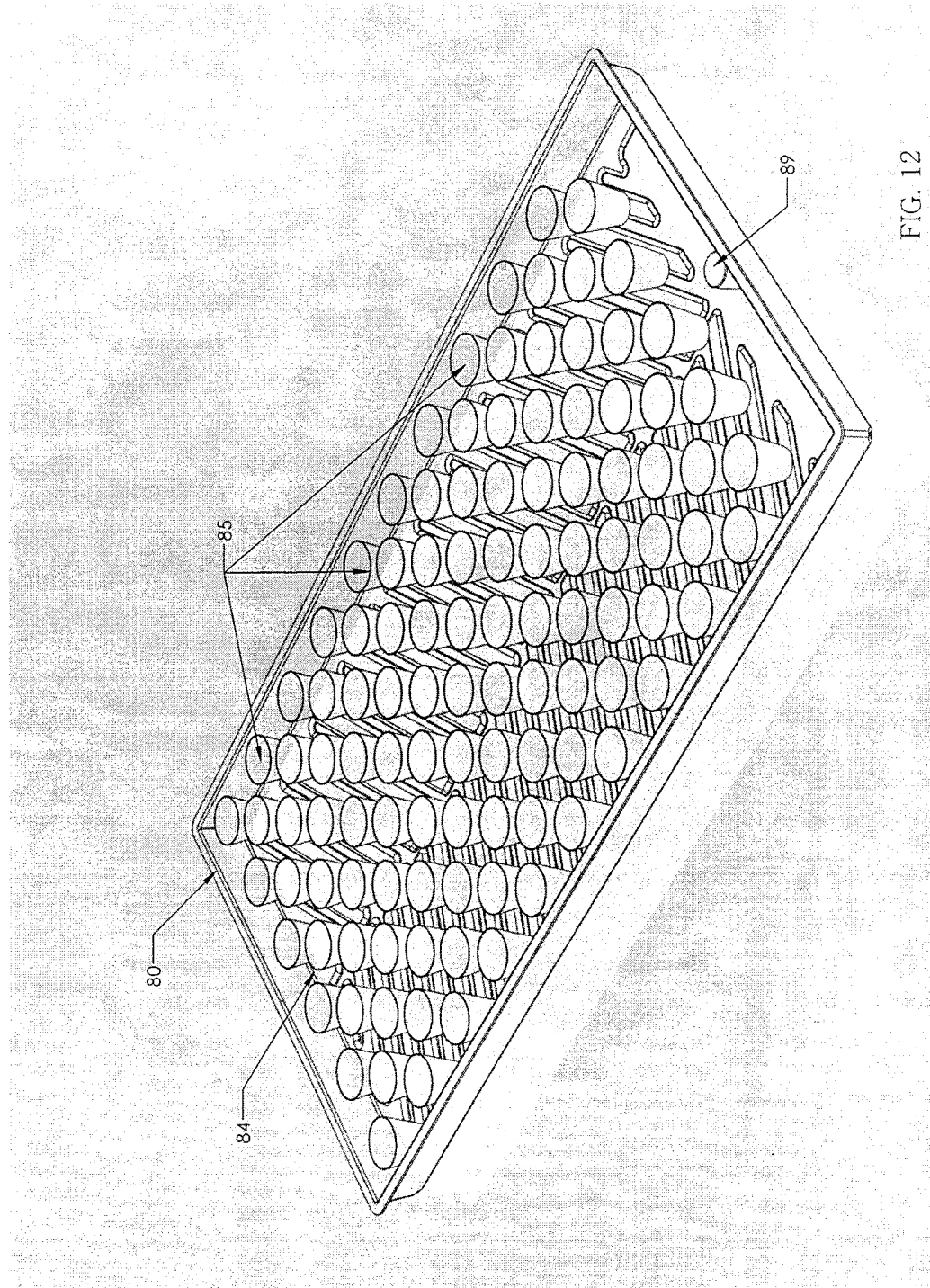
FIG. 12 is a perspective view of the tray shown in FIG. 11.
Figure 13:
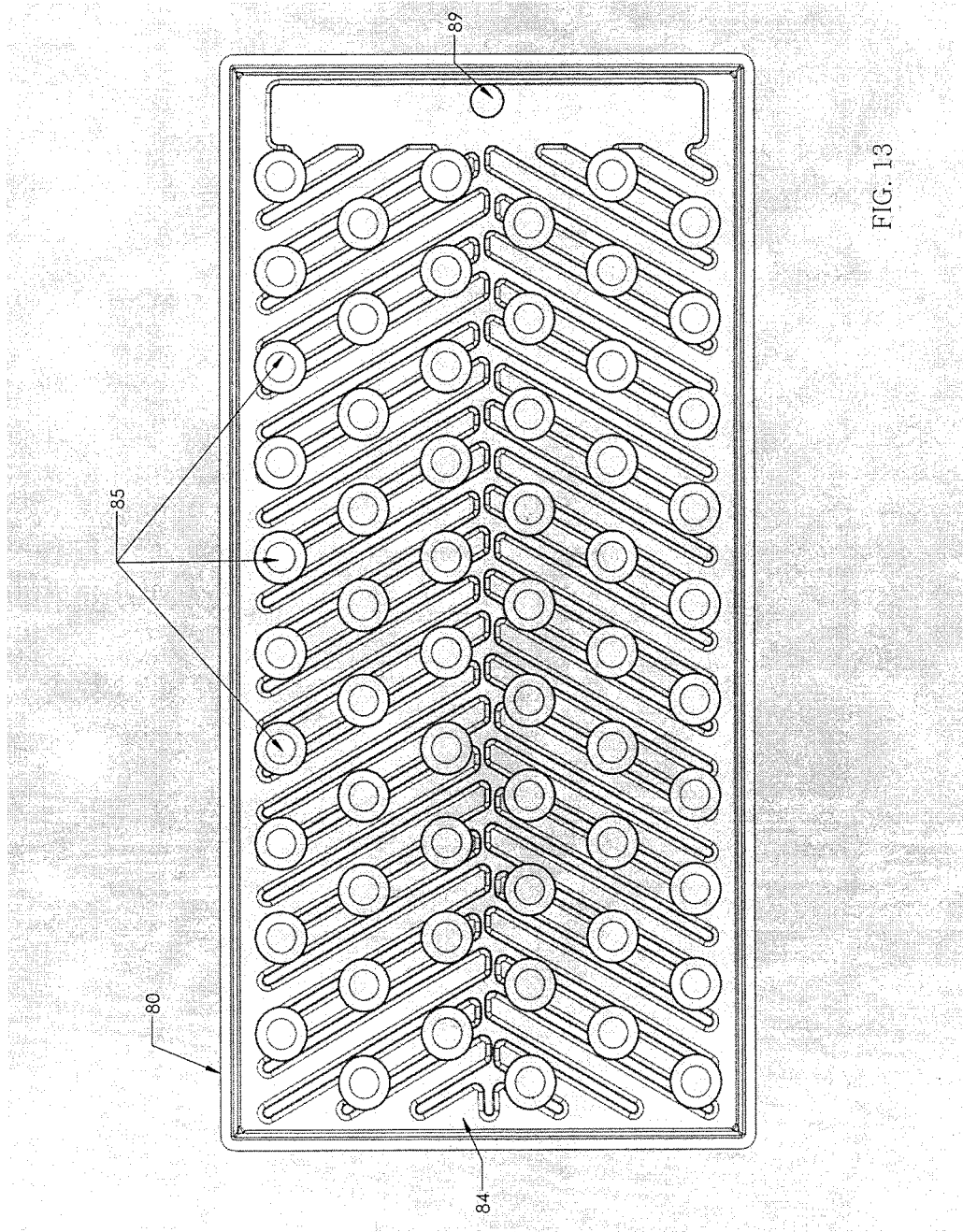
FIG. 13 is a top view of a tray for the third stage with 54 pots.
Figure 14:
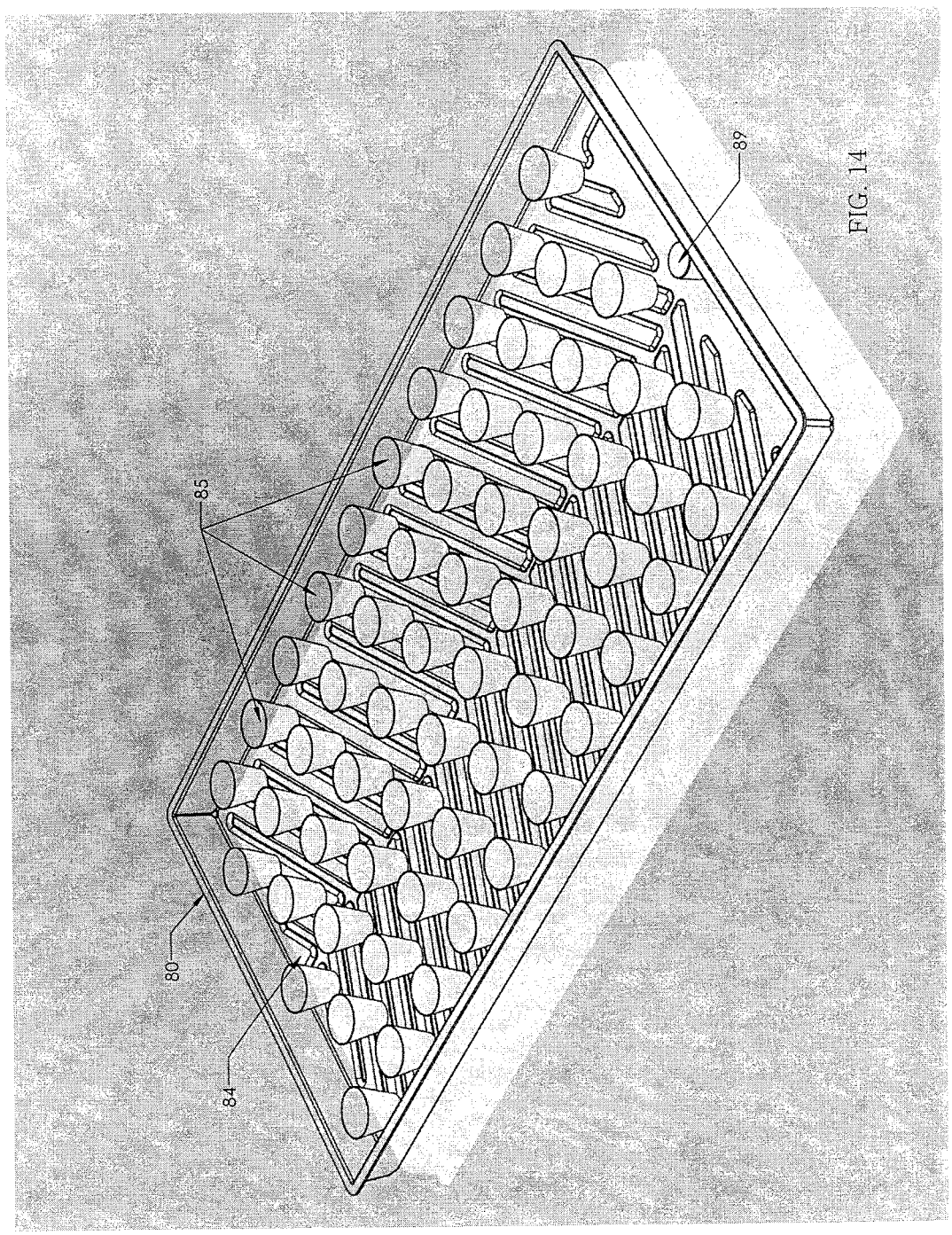
FIG. 14 is a perspective view of the tray shown in FIG. 13.
Figure 15:
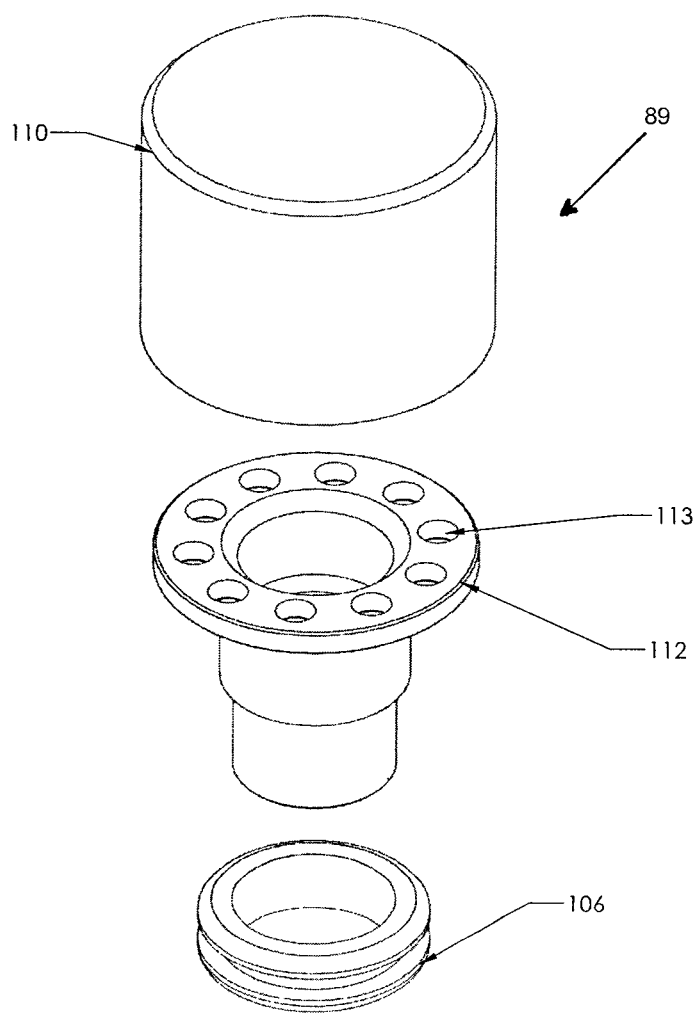
FIG. 15 is a perspective view of the bell siphon used to regulate drainage from the trays, with the outer housing in phantom outline for purposes of illustration.
Figure 16:
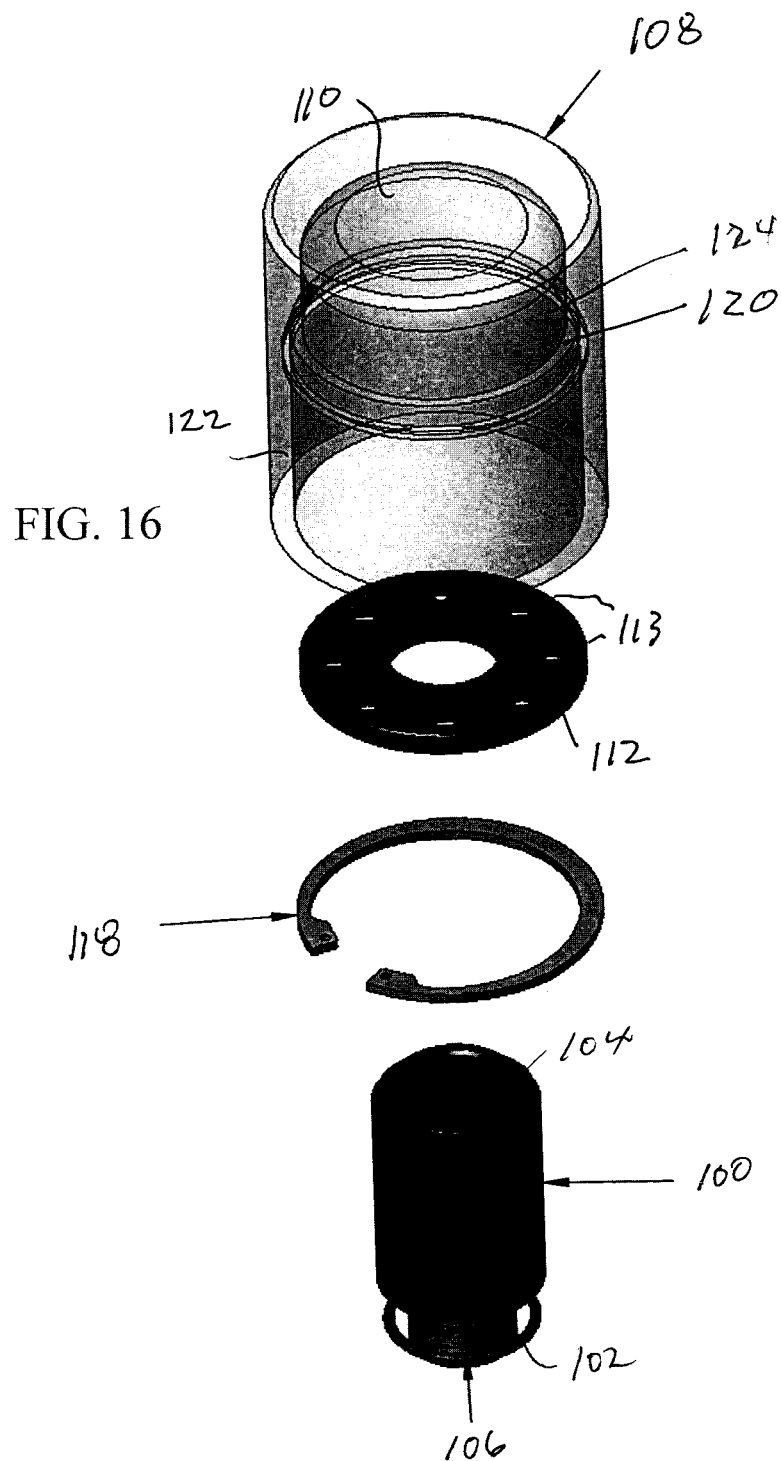
FIG. 16 is an exploded perspective view of a variant of the bell siphon shown in FIG. 15 with the outer housing in phantom outline for purposes of illustration.
Figure 18:
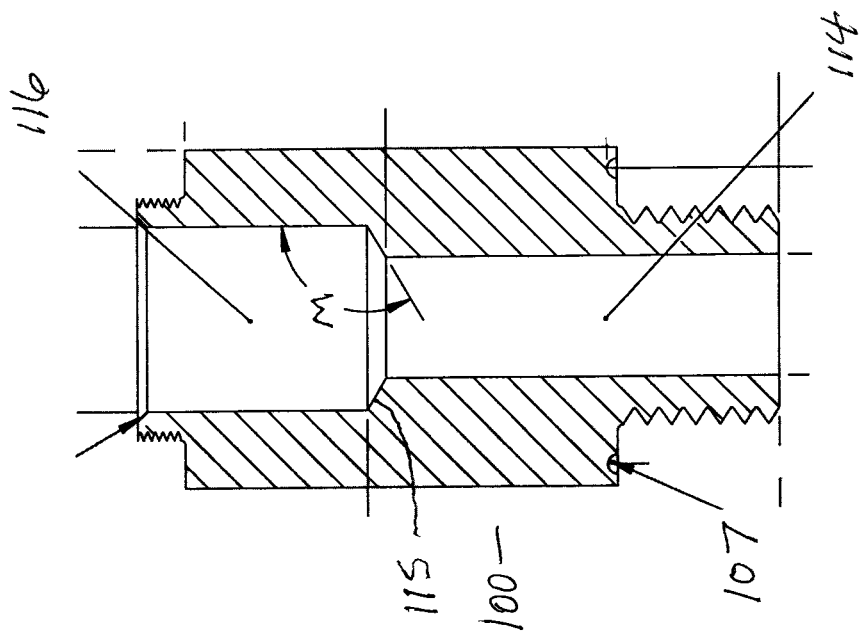
FIG. 18 is a cross-section of the restrictor shown in FIG. 17 taken along lines A-A.
Figure 17:
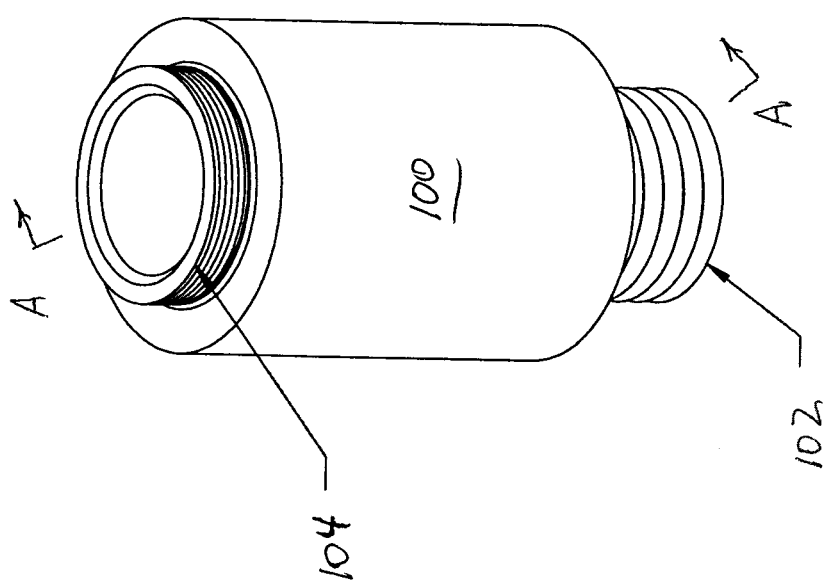
FIG. 17 is a perspective view of the restrictor part of the bell siphon shown in FIG. 16.

FIGS. 9 and 10 show the tray 80 loaded with flats 81 of seeded germination pucks 83 for placement in the first germination stage 28. FIGS. 11 and 12 illustrate the tray 80 after the flats 81 of seeded germination pucks from the first germination stage have been broken out into pots 85 for placement in the second growth stage 30. FIGS. 13 and 14 illustrate the tray 80 after the pots 85 from the second growth stage 30 have been thinned out for the third growth stage 32.

In operation trays 80 are planted with seeds in the seeding area 21. The number of seeds planted in each tray will depend on the type of plant, with the goal being that after the plants have been broken out into the third stage of growth, each tray 80 will be sufficiently filled with grown plants. In the example below, for example, to arrive at a finished crop of 55 lettuce heads per tray after the third growing stage 32, for the germination stage each tray 80 will contain about 1680 germination pucks seeded with lettuce seeds. Once the trays 80 are loaded with the flats of seeded pucks they are transported to the germination section 28 on scissor lifts.

After a sufficient germination period, each tray of seedlings is broken out into the number of trays required to fill the second stage section at that transport level, which in the embodiment shown is 5. The breaking out onto additional trays and loading into the next section 30 is done manually on scissor lift 34. Once the entire section 30 has been loaded the plants are permitted to grow for a sufficient period of time until it is necessary to break them out again into a greater number of trays, 15 in the embodiment shown. This is done manually on scissor lift 36. Again the plants are left in section 32 until they are ready to harvest. Meanwhile sections 28 and 30 are filled and growing with a new crop. Once the plants in section 32 are sufficiently mature, the trays 80 are manually removed from each level onto scissor lift 38 and loaded onto conveyor 26. The trays are then taken to the cropping and packaging section 16 where the plants are manually removed and packaged and stored in cold storage 18. Trays 80 then move to the cleaning section 20 where they are cleaned using washer 90 and drier 92 and returned to the seeding section where they are refilled with seeds.

Example—Romaine Lettuce

An example of application of the invention to the production of Romaine lettuce is described as follows. The preferred liquid nutrient solution mixes are:
i) a Bacterial Compost Tea mixed by, for each 20 L of filtered water adding
1.5 pounds (700 g) bacterial compost or vermicompost
3-4 tablespoons (45-60 ml) liquid black strap molasses
4 teaspoons (23 g) dry soluble kelp or 2 tablespoons of liquid kelp
3-4 teaspoons (15-20 ml) fish emulsion
ii) as a fertilizer/nutrient solution, PURA VIDA™ GROW produced by Technaflora Plant Products of Mission BC, Canada. EDTA Iron is added at 20 ppm to the final solution. 1 gallon of compost tea is added for each 50 gallons of the feed solution with each new batch mixture.

In the Stage 1, the germination stage 28, seeds are planted into Jiffy™ peat pucks 83 (preferably Item #70000591), which are seed starting plugs, 105 peat pucks per each germination flat 81 (see FIG. 9). The seeded puck trays 81 are saturated in the bacteria-dominated compost tea solution at 5.8 pH. A humidity dome (not shown) is placed on top of each germination flat 81. 16 germination flats 81 are placed in each tray 80 (see FIG. 9) and the tray is then loaded onto each level 48 of unit 44 in the germination section 28. Temperature is maintained at 69 degrees F. and humidity at 72%. For lighting, the light cycle (photoperiod) is set at 18 hours/On-6 hours/Off. During Days 1-4 the seeded flats are kept under humidity covers. On Day 5 the humidity covers are removed. On Day 7, the plants are sprayed with the full strength compost tea solution at 5.8 pH. For Days 7-15. the media is soaked once per day with a 400 ppm fertilizer solution at 5.8 pH.

At Day 15 the Plants are transplanted into molded plastic pots 85 filled with 75% Botanicare™ Cocogro® Coir Fiber media to 25% perlite. Botanicare ZHO™ Root Inoculant is added according to the label directions and also added is 1 tbsp dolomite lime per gallon of media saturated in the same compost tea mix used in the seeding process. Plants are spaced at 165 pots per growing tray 80 (See FIG. 11, 12) and placed onto each level 48 of unit 44 in the second stage section 30. For the second stage, the temperature is maintained at 62 degrees F., the humidity is maintained at 68% and the light cycle is kept at 18 hours On, 6 hours Off. At days 15-30, the grow trays 80 are flooded once a day with the fertilizer solution at 540 ppm at 5.8 pH. At Day 30, the media is saturated at 1 EC (electrical conductivity) and plants are sprayed with the full strength compost tea solution brewed as above at 5.8 pH. The Plants are then moved to the third stage section 32 and thinned to 55 plants (pots 85) per tray 80.

In the third stage section 32, the temperature is maintained at 62 degrees F., humidity is maintained at 68% and the light cycle is 18 hours On, 6 hours off. From Days 30-45, the trays 80 are flooded twice a day with the nutrient solution at 640 ppm at 5.8 pH. At Day 45 the Plants are harvested.

Thus using the invention, a continuous automated and controlled production of plants can be obtained. Different lighting, temperatures, humidity and nutrition can be programmed for the different growth stages of a crop and also for different crops. This can be done remotely by computer. Thus the installation can quickly change from producing one crop to another if demand for a crop and pricing are changing quickly. The land space required to produce a crop is dramatically reduced and can be further reduced by increasing the height of the growing units 44. The entire process can be automated using robots to transfer the plants at different stages.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within their true spirit and scope.

What is claimed is:
1. A system for continuous automated growing of plants, comprising a production line comprising a first and subsequent growth sections, each growth section comprising a plurality of horizontal transport levels, each level of each section having a source of light and liquid nutrient, and a plurality of growing trays for receiving an array of growing plants, which plurality of growing trays are adapted to move horizontally into, along and out of each one of said transport levels; whereby each subsequent growth section has a greater length than the previous section to thereby receive a greater number of growing trays than the previous section so that as said array of growing plants grow in said plurality of growing trays, the number of plants per growing tray is decreased but the number of plants per growth section remains generally constant.

2. The system of claim 1 comprising multiple production lines.

3. The system of claim 1 wherein each growth section comprises one or more multi-level growth units, each level of each unit being sized to receive one growing tray of said plurality of growing trays on each level.

4. The system of claim 3 wherein each growth unit is independently controlled for light, feeding and irrigation cycles which are computer controlled so that the system can be programmed for different plants having differing growth cycles, without any changes to the configuration of the production line.

5. The system of claim 1 wherein each said growing tray has an automatic filling and draining cycle which is regulated by a bell siphon.

6. The system of claim 5 wherein said bell siphon comprises a baffle having passages of variable diameter situated between a stand-up pipe and a bell so that the degree of vacuum and the timing of the filling and draining cycle can be variably selected.

7. The system of claim 1 wherein the number of growth sections is selected to correspond to a number of stages of equal duration in a growing process of the plants, so that when the plants in one of the plurality of growing trays is ready to be harvested from a last of said subsequent growth sections, the plants in the previous growth sections are ready to move into subsequent growth sections.

8. The system of claim 1 wherein each transport level comprises horizontal rollers and each said growing tray comprises a lower surface configured for horizontal movement on said horizontal rollers provided on each said transport level.

9. The system of claim 1 wherein lifting devices are provided between growth sections to facilitate transfer of plants and to move between different horizontal levels to remove the growing trays at the end of each production line.

10. A method for continuous automated growing of plants utilizing a production line comprising first and subsequent growth sections, each growth section comprising a plurality of horizontal transport levels, each level of each section having a controlled source of light and liquid nutrient, and a plurality of growing trays, each growing tray being adapted to move horizontally and longitudinally into, along and out of one of said transport levels; whereby each said subsequent growth section has a greater length than the previous growth section to thereby receive a greater number of growing trays than the previous growth section so that as plants grow in said growing trays, the number of plants per growing tray is decreased but the number of plants per growth section remains generally constant, the method comprising:
  i) planting a first group of said growing trays with seeds, the number of seeds planted in each said growing tray in said first group of growing trays being selected according to the type of plant, the size of growing trays, and the relative number and lengths of said growth sections;
  ii) introducing said first group of seeded growing trays into said first growth section;
  iii) after a sufficient germination period, transplanting a first group of plants from the first group of growing trays into a second group of growing trays comprising a greater number of growing trays than said first group of growing trays and able to be received in the first subsequent growth section;
  iv) introducing said second group of growing trays containing the first group of plants into said first subsequent growth section;
  v) introducing a third group of seeded growing trays into the first growth section;
  vi) after the first group of plants have grown for a sufficient period of time in said first subsequent growth section, transferring said first group of plants into a fourth group of growing trays comprising a greater number of growing trays than said second group of growing trays and able to be received in the next subsequent growth section;
  vii) introducing the fourth group of growing trays containing the first group of plants into the next subsequent growth section;
  viii) transplanting a second group of plants from the third group of growing trays into a fifth group of growing trays comprising a greater number of growing trays able to be received in the first subsequent growth section;
  ix) introducing the fifth group of growing trays containing the second group of plants into the first subsequent growth section;
  x) repeating steps i) through ix) mutatis mutandis for a sixth and subsequent group of seeded growing trays and a third and subsequent group of plants planted in said sixth and subsequent seeded growing trays;
  xi) once the plants in each group of the growing trays are in a final of said subsequent growth sections and are ready to harvest, removing the group of growing trays from said final of said subsequent growth sections and harvesting said plants.

11. The method of claim 10 wherein each plant moves from a growth section to the subsequent growth section at the same horizontal level as each said plant occupied in the previous growth section.

12. The method of claim 10 wherein the plants are harvested by transferring the growing trays containing the plants to a cropping and packaging section where the plants are removed from the growing trays and packaged.

13. The method of claim 12 wherein the growing trays are then cleaned and returned to a seeding section where they are refilled with seeds.

14. The method of claim 10 wherein each production line comprises the first growth section comprising a germination section, and the subsequent growth sections comprising one or more second stage growth sections and a final stage growth section.

15. The method of claim 10 wherein each growth section comprises one or more multi-level growth units, each level of each growth unit being sized to receive one of said plurality of growing trays.

16. The method of claim 15 wherein each growth unit is independently controlled for light, feeding and irrigation cycles whereby different plants having differing growth cycles are grown without changes to the configuration of the production line.

17. The method of claim 10 wherein lifting devices are provided between growth sections to facilitate transfer of plants.

18. The method of claim 10 wherein a lifting device is provided to move between different horizontal levels to remove the growth trays at the end of each production line.

19. The method of claim 10 wherein the number of growth sections is selected to correspond to a number of stages of equal duration in a growing process of the seeds planted, so that when the plants in one of the groups of trays is ready to be harvested from said final of said subsequent growth sections, the plants in groups of trays in previous growth sections are ready to move into subsequent growth sections.

\* \* \* \* \*